UNITED STATES PATENT OFFICE.

PEDER FARUP, OF TRONDHJEM, NORWAY.

PROCESS OF PRODUCING TITANIUM-OXYGEN COMPOUNDS FROM ILMENITE OR TITANIFEROUS IRON ORES AND OTHER MATERIALS.

1,156,220.  Specification of Letters Patent.  Patented Oct. 12, 1915.

No Drawing.  Application filed June 26, 1914.  Serial No. 847,513.

*To all whom it may concern:*

Be it known that I, PEDER FARUP, a subject of the King of Norway, residing at Trondhjem, Norway, have invented certain new and useful Improvements in Processes of Producing Titanium-Oxygen Compounds from Ilmenite or Titaniferous Iron Ores and other Materials; and I do hereby declare the following to be a full, clear, and exact description of the invention, such as will enable others skilled in the art to which it appertains to make and use the same.

This invention has for its object a process of producing titanium oxygen compounds from ilmenite or titaniferous iron ores and other materials which besides titanium also contain iron. According to the invention the material in question is treated with sulfuric acid and subsequently lixiviated.

It is a characteristic feature of the invention that the sulfate mass, obtained by the sulfuric acid treatment previously to its being leached, is heated to such a high temperature that oxid of titanium is obtained, while the sulfate of iron remains as such. By the subsequent leaching operation a residuum consisting principally of titanic acid will result.

When ilmenite ore or a titaniferous iron ore is used as an initial material the process may be carried out in the following manner: The ilmenite ore is brought into a finely divided state and is mixed with 1-2 parts by weight of concentrated sulfuric acid. By the reaction which is produced, and which may be initiated by the supply of heat, a solid sulfate mass is obtained, which is then more strongly heated preferably to a temperature of about 600° C. The mass has properties which makes it suitable as a contact substance, and these properties may be employed for the production of sulfuric acid by passing roaster gases in contact with the same during the heating operation. By this treatment the sulfate of titanium is decomposed, while the sulfate of iron for the greater part will remain in an unaltered condition. When cooled the mass is leached with water, whereby practically all the iron is dissolved out while the titanium oxid together with the gangue remains undissolved. The crude titanic acid (of a content of for instance about 80 per cent.) which is obtained and the mass dried, is a valuable commercial product. From the crude titanic acid a pure product is obtained by a subsequent treatment which may be carried out as follows: The crude titanic acid after having been mixed with sulfuric acid or a bisulfate and heated until it has become solid, is then mixed with chlorid of sodium or another chlorid whereupon it is heated preferably to a temperature of up to 700° C. with or without access of air or roaster gases. The product is leached with water and a residuum is obtained consisting of pure titanium oxid. In some cases in which the impurities contained in the crude titanic acid or similar products are easy to dissolve, the addition of a chlorid is not necessary. A pure product may in these cases also be obtained by causing the crude titanic acid material to form a hard sulfate mass by means of sulfuric acid and by heating the sulfate mass so produced to such a temperature, that the iron sulfates remain unaltered, while the titanium-sulfates are transformed into oxids which are insoluble or only to a small extent soluble in water. This mass is then leached with water.

Instead of the crude titanic acid above mentioned, other products may be employed. It is for instance known that by treating titanium iron ores with concentrated hydrochloric acid a residuum may be obtained, which principally consists of titanic acid. Instead of as above described subjecting the partly decomposed sulfate mass obtained after heating to 600° C. or the mass used as a contact substance to a leaching with water the mass may be mixed with a chlorid either directly or after having been treated with sulfuric acid or a bisulfate and heated until it is solidified, whereupon it is preferably heated to a temperature of 700° C. with or without access of air or roaster gases. By leaching the product with water a residuum is obtained, which consists of a white and comparatively pure titanic acid. Further the mass obtained by treating ilmenite with sulfuric acid may be used directly; without having first been heated to decompose the titanic acid, it is then treated directly with a chlorid for instance chlorid of sodium and heated with or without the access of air or roaster gases preferably mass is leached with water. There is then obtained as a residuum a product very rich in titanium oxid.

I claim:

1. The process of producing titanium oxygen compounds from materials containing titanium and iron which comprises the steps of treating the titanium iron material with sulfuric acid, heating the mass so obtained to a temperature at which the titanium sulfates are decomposed while the iron sulfates remain substantially unaltered, and thereupon leaching the resulting mass.

2. The process of producing titanium oxygen compounds from material containing titanium and iron, which comprises treating the material with sulfuric acid to produce sulfates of titanium and of iron, heating the mass so obtained to decompose the titanium sulfates without decomposing the iron sulfates, removing the sulfate of iron, then heating the product in the presence of chlorid and leaching the resulting chlorid product.

3. The process of producing titanium oxygen compounds from materials containing iron and titanium, which comprises the steps of treating the titanium iron material with sulfuric acid, heating the mass so obtained to a temperature of about 600° C., at which the titanium sulfates are decomposed and titanous oxids obtained, while the iron sulfates remain substantially unchanged and supplying air or roaster gases to the mass during this heating operation, to produce sulfuric acid and subjecting the resulting mass to leaching.

4. The process of producing titanium oxygen compounds from materials containing titanium and iron which comprises the steps of treating the titanium iron material with sulfuric acid, heating the mass so obtained to a temperature at which the titanium sulfates are decomposed while the iron sulfates remain substantially unaltered, and thereupon leaching the resulting mass, adding a chlorid to the residuum obtained by this leaching, heating the mixture, and subjecting the resulting mass to leaching.

5. The process of producing titanium oxygen compounds from materials containing titanium and iron which comprises the steps of treating the titanium iron material with sulfuric acid, heating the mass so obtained to a temperature at which the titanium sulfates are decomposed while the iron sulfates remain substantially unaltered, and leaching the resulting mass, adding a chlorid to the residuum obtained by this leaching, heating the mixture to about 700° C. and leaching the resulting mass.

6. The process of producing titanium oxygen compounds from materials containing titanium and iron which comprise the steps of treating the titanium iron material with sulfuric acid, heating the mass so obtained to a temperature at which the titanium sulfates are decomposed while the iron sulfates remain substantially unaltered, and leaching the resulting mass, treating the residuum with sulfuric acid or a bisulfate, adding a chlorid to the mass, heating the mass supplying air or roaster gases to the mass during this heating, and leaching the resulting product.

7. The process of producing titanium oxygen compounds from material containing titanium and iron, which comprises converting the titanium and iron contents into sulfates, converting the titanium sulfate so formed, by heat, into oxid while maintaining the iron sulfate substantially unaltered, and removing the iron sulfate from the resulting product.

In testimony that I claim the foregoing as my invention, I have signed my name in presence of two subscribing witnesses.

PEDER FARUP.

Witnesses:
TRY GUELOKEN,
O. BJORK NIELSEN.